July 16, 1946.    R. A. GOEPFRICH    2,404,054
BRAKE CONSTRUCTION
Filed Dec. 13, 1944

INVENTOR.
RUDOLPH A. GOEPFRICH
BY

Patented July 16, 1946

2,404,054

UNITED STATES PATENT OFFICE 2,404,054

BRAKE CONSTRUCTION

Rudolph A. Goepfrich, South Bend, Ind., assignor to Bendix Aviation Corporation, South Bend, Ind., a corporation of Delaware Application December 13, 1944, Serial No. 567,935

3 Claims. (Cl. 188—106)

This invention relates to improvements in brakes, and particularly to novel parking or auxiliary brake applying mechanism which supplements the usual vehicle hydraulic brake applying system.

The principal object of the invention is to provide parking brake applying mechanism suitable for a brake structure in which the space is severely limited due to the arrangement of the service brake applying mechanism and the torque reaction means of the brake.

Figure 1:
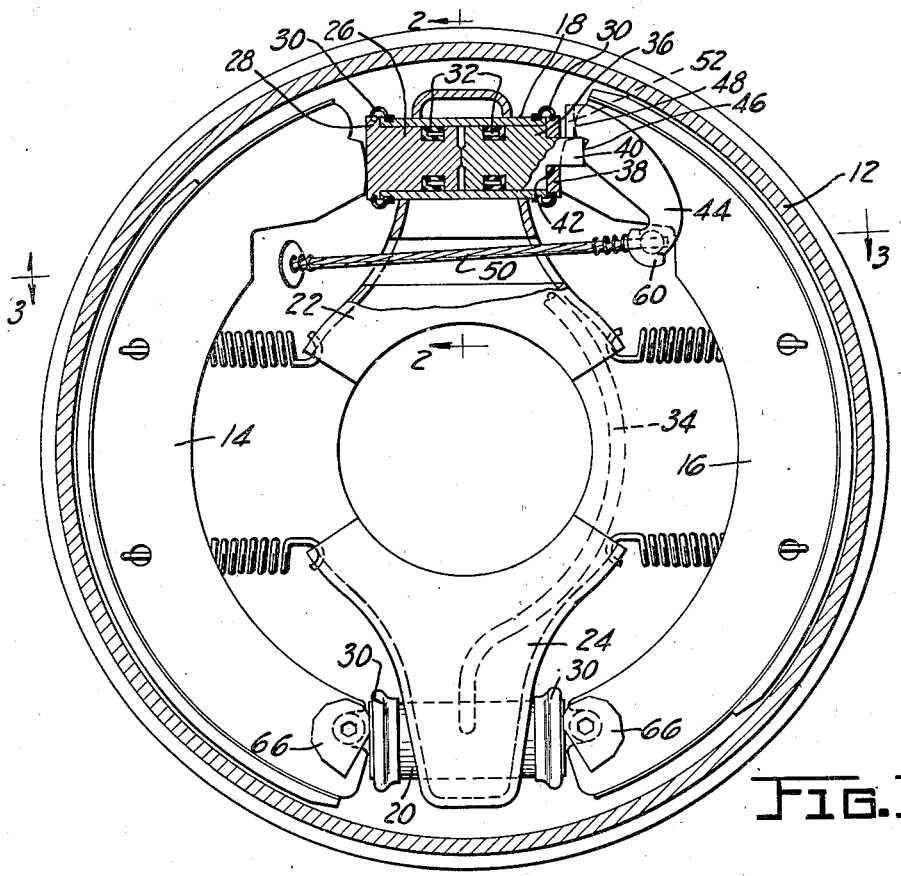
Figure 3:
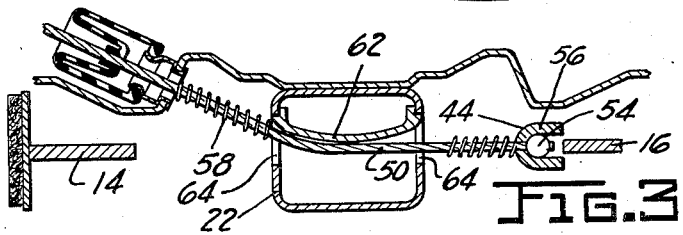
Figure 2:
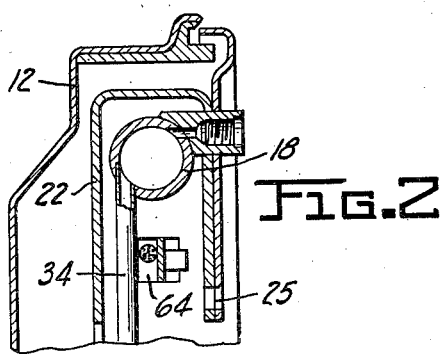

Other objects and advantages will become apparent during the course of the following description, reference being had therein to the accompanying drawing, in which:

Figure 1 is a side elevation showing a brake assembly, with parts thereof in section; and Figures 2 and 3 are sections taken on the lines 2—2, and 3—3, respectively, of Figure 1.

Referring to the drawing, a rotating brake drum 12 is adapted to be slowed or stopped by the spreading of shoes 14 and 16. Hydraulic brake applying means are provided for accomplishing the normal or service application of the brake. While the hydraulic means for spreading the shoes may be arranged in any desired manner without affecting the present invention, for purposes of illustration I have shown an arrangement in which two hydraulic cylinders 18 and 20 are provided for simultaneously exerting a force against both ends of both shoes tending to move them against the drum.

The cylinders 18 and 20, which may be formed by cutting tubing to the desired length, are shown supported by means of box section stampings 22 and 24, the rear walls of which are secured to a fixed part of the vehicle by suitable fastenings for which the openings 25 are provided. It is obviously not necessary that the cylinders 18 and 20 and support or torque reaction members 22 and 24 be formed in the manner described, in order to make the present invention applicable.

The arrangement is such that the shoes 14 and 16 transmit their anchoring torque through the cylinders 18 and 20 to the torque reaction members 22 and 24. To this end, the two pistons in cylinder 20 and piston 26 in cylinder 18 may be provided with flanges 28 which anchor against the cylinder wall in one direction of drum rotation. Rubber boots or covers 30 may be provided to exclude dirt from the interior of the cylinders, and suitable seals 32 may be utilized to prevent escape of liquid from the cylinders. A conduit 34 may be used to interconnect cylinders 18 and 20.

It will be readily understood that the normal or service brake applications are accomplished by forcing fluid under pressure from the usual master cylinder into the space between the pistons of the respective wheel cylinders to spread the pistons, thereby exerting a force against the ends of the shoes to move them into contact with the drum. Due to the wrapping action of the rotating drum on the shoes, each of the shoes will anchor at one end on one of the cylinders in the known manner.

In order to provide parking brake applying mechanism within the limited space afforded, and to furnish a particularly simple parking brake applying mechanism, I propose to transmit force mechanically through the pistons of cylinder 18. Piston 36, which is provided in cylinder 18, differs from piston 26 in that it does not have an anchoring flange. Instead, when shoe 16 anchors on cylinder 18, the torque is transmitted through a plate like anchor member 38 which contacts the cylinder wall. Piston 36 is therefore free to move toward the left (as seen in Figure 1). Piston 36 has an integral projection 40 extending through an opening 42 in anchor member 38, said projection 40 being slotted to receive the end of the shoe. A lever 44 abuts at 46 against the projection 40, and abuts at 48 against the end of shoe 16. A cable 50 is connected to the lower end of lever 44 to move the same in a clockwise direction, thereby spreading the upper ends of the shoes.

The lever 44 is preferably bifurcated, having two spaced body portions of similar configuration embracing between them the web of shoe 16. The lever may be folded over as shown at 52 in such a way that the portion which joins the two forked portions of the lever bears against the end of shoe 16. As illustrated particularly in Figure 3, a ball member 54 may be secured to the end of cable 50 and may be retained in connection with lever 44 by the bent over edges 56 formed at the lower end of the lever forks. A compression spring 58 retains the bent over edges 56 of the lever against the ball member 54 on the cable. Furthermore, the lower edges 60 of the two forks of the lever may be bent inwardly to contact one another and may be then welded together, thus improving the strength and reliability of the structure. To cooperate with the bifurcated lever, the extension 40 on piston 36 is forked to embrace the shoe web, each fork of the extension 40 contacting one fork of the lever.

A stamping 62 may be secured inside box section member 22 in such a way as to provide a ramp for cable 50, which extends through openings 64 in the side walls of the box section member.

When the operator desires to use the parking or auxiliary brake applying mechanism he causes cable 50 to be drawn toward the left, thereby swinging lever 44 in a clockwise direction. Portion 52 of the lever exerts a force tending to move the end of shoe 16 into contact with the drum, while the portion 46 of the lever acts through extension 40 and piston 36 to move piston 26 and the upper end of shoe 14 toward the left against the drum.

With this arrangement, an effective parking brake applying mechanism is adapted to a particularly small available space, utilizing, for the most part, structural members which are required for the normal or service application of the brake. With the slight distance between effective contact points 46 and 48 of lever 44, a relatively short lever construction gives a sufficiently high leverage ratio, and the actuation of the parking brake applying means may be accomplished with a relatively slight movement of the lower end of the lever. Where the webs of the shoes lie in substantially the center plane of the brake, as in the present case, it is particularly important to provide parking brake actuating mechanism which will require a minimum of room. Utilizing a brake wherein the shoe webs are in substantially the center plane of the brake assembly has the very important advantage of centralizing the braking torque with respect to the torque reaction means, and thereby avoiding deflection of said torque reaction means.

Adjustment of the shoes for lining wear may be provided by means of adjustors 66. These are located at the opposite side of the brake assembly from the parking brake applying mechanism, in order that adjustment of the shoes will not create slack in said applying mechanism.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a brake having a hydraulic cylinder and two shoes adapted to either be applied by or anchor through said cylinder, a first piston reciprocable in said cylinder having a flange limiting the inward movement of the piston and adapted to transfer anchoring torque of the first shoe to the cylinder wall, a second piston in the cylinder butting against the first piston and free to move either inwardly or outwardly of the cylinder, an anchor member adapted to transmit the torque of the second shoe directly to the cylinder wall, said second piston having a projection extending through an opening in the anchor member, a lever pivoted to the second shoe and to the projection on the second piston, and means for actuating the lever to spread the ends of the shoes, the second piston acting through the first piston on the first shoe.

2. In a brake having a hydraulic cylinder and two shoes which may either be applied by or anchored through said cylinder, a first piston reciprocable in said cylinder adapted to actuate the first of said shoes, means for transmitting anchoring torque from the first shoe to the cylinder wall, a second piston in the cylinder adapted to contact the first piston inside the cylinder and movable either inwardly or outwardly with respect to the cylinder, an anchor member adapted to transmit the anchoring torque of the second shoe directly to the cylinder wall, said second piston having a projection extending through an opening in the anchor member, and a lever pivoted on the second shoe and on the projection of the second piston and adapted to spread the ends of the shoes when rotated.

3. In a brake having a hydraulic cylinder and two shoes which may either be applied by or anchored through said cylinder, a first piston reciprocable in said cylinder adapted to actuate the first of said shoes, means for transmitting anchoring torque from the first shoe to the cylinder wall, a second piston in the cylinder adapted to contact the first piston inside the cylinder and movable either inwardly or outwardly with respect to the cylinder, an anchor member adapted to transmit the anchoring torque of the second shoe directly to the cylinder wall, and a lever pivoted on the second shoe and on the second piston and adapted to spread the ends of the shoes when rotated.

RUDOLPH A. GOEPFRICH.